Figure 1:
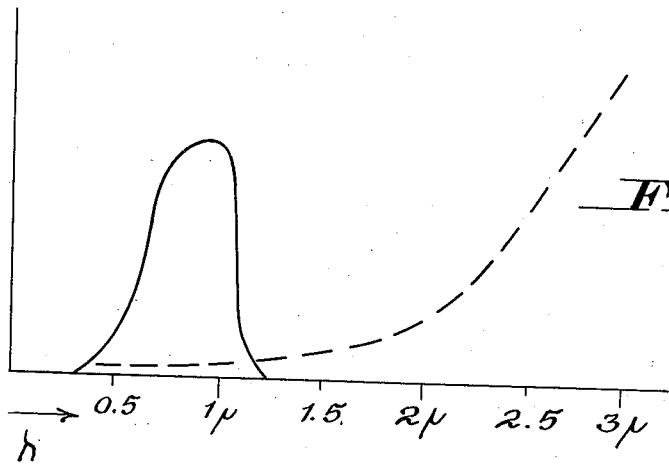

Sept. 27, 1938.  F. MICHELSSEN  2,131,328
LIGHT CONTROLLED SIGNALING SYSTEM
Filed April 15, 1935

Inventor:
F. Michelssen
By Glascock Downing Seebold
Attorney

Patented Sept. 27, 1938

2,131,328

UNITED STATES PATENT OFFICE 2,131,328

LIGHT-CONTROLLED SIGNALING SYSTEM

Fritz Michelssen, Berlin-Steglitz, Germany, assignor to Neufeldt & Kuhne G. m. b. H., Kiel, Germany Application April 15, 1935, Serial No. 16,515
In Germany April 14, 1934

8 Claims. (Cl. 250—1)

(Granted under the provisions of sec. 14, act of
March 2, 1927; 357 O. G. 5)

This invention relates to light-controlled optical systems, more particularly signaling systems and sound-film installations. It is known in optical-signaling systems to modulate the ray of light, coming from a source of light and concentrated by suitable mirrors or lenses, by means of an electrically moved shutter, Kerr-cell or like device in such a manner that when the ray of light impinges on a photo-electric cell voltage variations are produced in the rhythm of the light modulation. Such arrangements may be used for telegraphic purposes, as well as for telephony; in the latter case the shutter is electrically operated by the alternating currents in an output circuit of an amplifier, the input circuit of which contains a microphone. The devices above referred to have the advantage as compared with other signaling systems, for instance as compared with wireless telegraphy and telephony, that the signal carrier, that is to say, the wave of light, can be directed on the receiving apparatus in a very narrow beam so that the danger of unauthorized persons hearing or disturbing the transmission is avoided.

In the known systems of light telephony, use is generally made of a source of light which transmits mainly red and infra-red rays. These rays of light of long wavelength have the advantage that they are less absorbed or destroyed by fog or other impurities in the air so that the range of such rays, as compared with the range of white light, is considerably increased.

A wave-range of about 0.4 to about 2.5μ is now generally available for the transmission of this kind of light telephony. With such a frequency band covering about three octaves, optical apparatus working on a principle of light refraction, more particularly lens systems, have very different properties. For instance, if the incoming ray of light is optically concentrated at the receiving end on a small point of the receiving cell, it is not possible to unite uniformly all the spectrum ranges transmitted by the original source of light on a small point or surface; on the contrary, the optical system will have the optimum effect only for a definite wavelength or a definite narrow wave band, whilst the other waves can be more or less dispersed and are ineffective. This is especially detrimental, for instance in the case of light-sensitive cells working on the contact principle. If use is made for the receiving device of a lead sulphide or similarly acting cell in which the received ray is directed, for instance on the contact point of a metal point with a crystal of lead sulphide only a small portion of the incoming energy can be usefully utilized to control the cells, namely those waves which are concentrated by the optical system exactly on to the contact point. The other waves are substantially ineffective.

In the arrangements of light telephony and telegraphy as hitherto employed, it has been usual to effect the optical concentration of the beam of light transmitting the signal purely visually, that is to say, the optical system was adjusted to that part of the beam of waves which is visible to the eye, that is to say, approximately 0.7 to 0.75μ.

Experiments which have been carried out with respect to sensitiveness in connection with lead sulphide cells and other contact and photo-electric cells have shown that more particularly the lead sulphide cells have a very great sensitiveness for waves having a length greater than 1.2 and more particularly beyond 1.5μ. These ranges of high sensitiveness extend up to more than 2.4μ.

According to the invention, the arrangement is adjusted to the above last-mentioned wavelengths which actually reach the receiving cell; in contradistinction to the method hitherto employed, the arrangement is no longer adjusted to the visible part of the transmitted ray of light, but it is dimensioned for the above-mentioned wavelength of more than about 1.2 and more particularly 1.5μ. With these wavelengths the sensitiveness and, consequently, the efficiency of the whole of the arrangement is considerably increased as compared with arrangements adjusted to the visual wavelength.

The invention may be carried out into effect in various ways. A very useful method is to employ systems of lenses, more particularly on the receiving side, but also at the transmitter, which lens systems are corrected spherically and chromatically in such a way that the concentration of the beam of light on the photo-electric cell or on the contact point of a lead sulphide or like light-sensitive cell is most accurate for a wavelength of about 1.5 to about 2.5μ. In this way it is ensured that the receiving cell is acted upon only or principally by those rays for which it is most sensitive. At the same time the arrangement, according to the invention, has the advantage that those wavelengths for which the receiving cell is most sensitive, are identical with those waves or that wave range for which the path of transmission is most suitable.

According to another arrangement, use is made of filters at the transmitting or receiving end for the filtration of those waves or ranges of waves which lie outside the maximum range of sensitiveness of the receiving cell.

Finally, the source of light is preferably so constructed that it mainly or exclusively transmits infra-red light of those wavelengths to which the receiving cell shows a maximum response. In such a case one can operate the apparatus practically without any loss.

The drawing represents—by way of example—the function of the invention: Fig. 1 shows the function of an optical system known in the art, Fig. 2 shows the function of the new optical system according to the invention.

Figure 2:
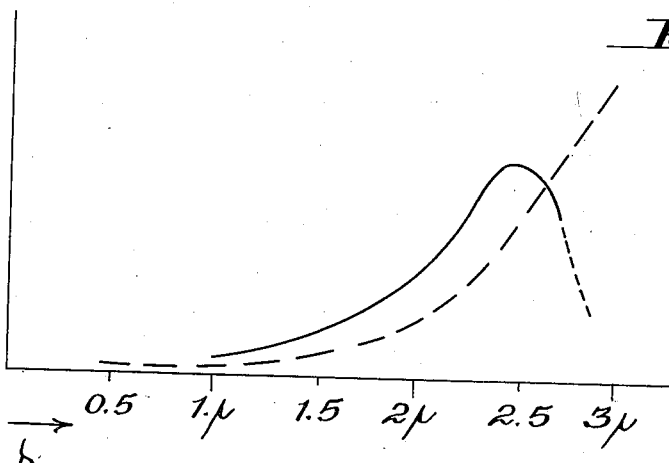

In the diagram of Fig. 1 and Fig. 2 the abscissae represent the wave-length, explained in "$\mu$", the ordinates represent the sensitiveness of the light-sensitive cell (full lines) and the transmission factor of the medium atmosphere (dotted lines).

According to Fig. 1 the maximum sensitiveness of the cell coincides with the minimum of transmission factor, which gives a very bad efficiency of the entire system. According to Fig. 2 the full line curve represents the sensitiveness of a lead sulphide cell, and both curves have nearly the same form between 0.5 and 2.5$\mu$; that gives a very good efficiency, which is further improved by correcting the employed lens system spherically and chromatically in the way described in the specification.

Figure 3:
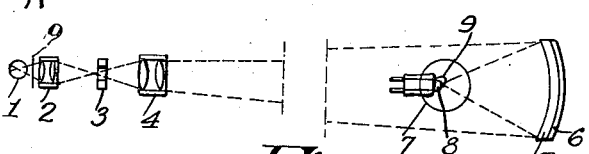

Figure 3 illustrates diagrammatically a general arrangement for the transmission of infra-red light signals. Light, the wave lengths of which lie within the range of about 1.2$\mu$ to about 2.5$\mu$ and more is transmitted from an infra-red lamp 1, the rays of light passing first of all through an achromatic system of lenses 2, and then being concentrated on a point in a shutter 3. There follows a system of lenses 4, preferably also achromatic, which transmits the rays of light in the form of a narrow and parallel beam. At the receiving end there is provided achromatic and spherically corrected hollow mirror which consists in a known manner of a glass portion 5 and a reflecting back surface 6. This mirror projects the incoming rays of light on a lead sulphide cell 7, working on the contact principle. The cell comprises a lead sulphide crystal 8 and a needle-shaped counter-electrode 9 which rests thereon. The crystal and the needle electrode 9 are connected to respective leads. The mirror 5, 6 concentrates the incoming rays within the range of infra-red waves of about 1.2 to 2.5$\mu$ exactly on to the point contact of the cell 7. A light filter 9 of suitable substance to transmit only the range of waves desired may be associated with the light source as shown.

What I claim is:

1. A light-controlled device comprising in combination a source of light transmitting rays, the wave lengths of which lie between about 1.5$\mu$ and about 2.5$\mu$ and a lead sulphide cell for receiving the said waves.

2. A light-controlled device comprising in combination a source of light transmitting rays, the wave lengths of which lie between about 1.5$\mu$ and about 2.5$\mu$, a lead sulphide contact cell and optical means for focusing the light waves of 1.5 to 2.5$\mu$ exactly on the contact point of the lead sulphide contact cell.

3. In a light-signaling system the combination of a device transmitting rays comprising a waveband the maximal amplitudes of which lie between about 1.5$\mu$ and about 2.5$\mu$, and a lead sulphide cell for receiving said waves.

4. In a light-signaling system the combination of a device transmitting rays comprising a waveband the maximal amplitudes of which lie between about 1.5$\mu$ and about 2.5$\mu$, and a lead sulphide contact cell for receiving said waves.

5. In a light-signaling system the combination of a device transmitting rays comprising a wave-band the maximal amplitudes of which lie between about 1.5$\mu$ and about 2.5$\mu$, a lead sulphide cell for receiving said waves, and optical means which are corrected chromatically to a band of about 1.5$\mu$ and about 2.5$\mu$ for focusing the said rays on the cell.

6. In a light-signaling system the combination of a device transmitting rays comprising a wave-band the maximal amplitudes of which lie between about 1.5$\mu$ and about 2.5$\mu$, a lead sulphide contact cell for receiving said waves, and optical means associated with said lead sulphide contact cell, which are corrected to a band of about 1.5$\mu$ for concentrating the rays exactly on the contact point of said lead sulphide contact cell.

7. In a light-signaling system the combination of a device for transmitting rays comprising a wave-band the maximal amplitudes of which lie between about 1.5$\mu$ and about 2.5$\mu$, and a lead sulphide cell for receiving said waves, and means comprising an optical filter adjacent said ray transmitting device for the filtration of those waves ranges which lie outside the maximum range of sensitiveness of the receiving cell.

8. In a light-signaling system the combination of a device transmitting light rays comprising a wave-band the maximal amplitudes of which lie between about 1.5$\mu$ and about 2.5$\mu$, and a lead sulphide cell for receiving said waves, said light transmitting device comprising a source of light so constructed that it mainly transmits ultra-red light of those wavelengths to which said receiving cell shows a maximum response.

FRITZ MICHELSSEN.